United States Patent [19]

Melanson et al.

[11] Patent Number: 5,835,393

[45] Date of Patent: Nov. 10, 1998

[54] INTEGRATED PRE-ADDER FOR A MULTIPLIER

[75] Inventors: John Laurence Melanson, Boulder, Colo.; Finn Thoeger Moeller, Frederiksberg, Denmark

[73] Assignee: AudioLogic Hearing Systems, L.P., Boulder, Colo.

[21] Appl. No.: 752,021

[22] Filed: Nov. 19, 1996

[51] Int. Cl.[6] ........................................ G06F 7/52
[52] U.S. Cl. ........................ 364/760.01; 364/736.02; 364/748.07; 364/750.5; 364/754.01; 364/757; 364/759; 364/760.01; 364/760.02; 364/760.05
[58] Field of Search ................. 364/736.02, 748.07, 364/750.5, 754.01, 757, 759, 760.01, 760.05, 760.02

[56] References Cited

U.S. PATENT DOCUMENTS

| | | | |
|---|---|---|---|
| 4,546,446 | 10/1985 | Machida | 364/757 X |
| 4,575,812 | 3/1986 | Kloker et al. | 364/760.03 |
| 4,864,528 | 9/1989 | Nishiyama et al. | 364/746.2 |
| 5,262,976 | 11/1993 | Young et al. | 364/760.01 |

OTHER PUBLICATIONS

Weste, Neil H.E., and Kamran Eshraghian, *Principles of CMOS VLSI Design: A Systems Perspective,* Chapter 8, "Subsystem Design: Datapath Operators," Addison–Wesley Publishing Company (1993), pp. 545–554.

Vaidyanathan, P.P., *Multirate Systems and Filter Banks,* Part 2, Chapter 5, "Multirate Filter Banks: Maximally Decimated Filter Banks," Prentice Hall, pp. 188–285.

*Primary Examiner*—Ayaz R. Sheikh
*Assistant Examiner*—Douglas S. Lee
*Attorney, Agent, or Firm*—Jennifer L. Bales; Macheledt Bales & Johnson LLP

[57] ABSTRACT

A preadder for a multiplier integrates a pre-adder and Booth encoder. The integrated pre-adder/Booth encoder comprises multiple stages, each of which adds and encodes multiple bits (usually two) of two numbers x and y. Each stage comprises three blocks, a first carry generation block, a second carry generation block, and an output code generation block. The x input bits and y input bits are input into the first carry block, which generates a first carry out and multibit combination signal, which generally comprises the x input bits and y input bits carried straight through or only slightly modified. The combination signal and a first carry in signal are inputs to the second carry generation block. Generally, the first carry in is the is the first carry out of another stage which is combining less significant bits than the present stage. The second carry generation block generates a second carry out signal and a sum signal. The sum signal generally comprises bits of x added or otherwise combined with bits of y. The sum signal and a second carry in signal are inputs to the code generation block. Generally, the second carry in signal is the second carry out signal of another stage which is adding less significant bits. The code generation block generates the Booth code of the sum signal, accounting for the second carry in signal.

11 Claims, 13 Drawing Sheets

INTEGRATED PRE-ADDER FOR A MULTIPLIER

BACKGROUND OF THE INVENTION

1. Field of the Invention

The present invention relates to an integrated pre-adder for a multiplier device.

2. Description of the Prior Art

In Digital Signal Processing (DSP) applications, there are many uses for an unit that would produce the result x=(a+b)*c+d, called here a pre-add multiplication accumulation unit (PMAC). In digital signal processors, the operation x=a*b+c is usually supported, and is called a multiply accumulate (MAC). Many applications are known for a PMAC, but there has been no efficient implementation.

In order to appreciate how useful a PMAC would be, consider the following examples. Linear phase FIR (fine impulse response) filters are important in signal processing. As an example an 8th order filter would take the form:

$$y_n = a0^*x_n + a1^*x_{n-1} + a2^*x_{n-2} + a3^*x_{n-3} + a3^*x_{n-4} + a2^*x_{n-5} + a1^*x_{n-6} + a0^*x_{n-7}$$

This would require 8 MAC operations, but could be done in 4 PMAC operations, as follows:

$$y_n = a0^*(x_n + x_{n-7}) + a1^*(x_{n-1} + x_{n-6}) + a2^*(x_{n-2} + x_{n-5}) + a3^*(x_{n-3} + x_{n-4})$$

This halving of cycles would yield important performance advantages and power savings, as for example in a DSP based hearing aid.

A complex multiplication is an important ingredient to many signal processing applications. Two numbers, a+bi and c+di, form the product $$(a+bi)^*(c+di) = (ac-bd) + (ad+bc)i$$

This requires four MAC operations.
With a PMAC, the following formulation can be used.

$$(a+bi)^*(c+di) = (p1+p2) + (p1+p3)i$$

where
p1=(a+b)*c=ac+bc
p2=(c+d)*-b=-bc-bd
p3=(d-c)*a=ad-ac

Thus, 3 PMAC operations could be used, resulting in a 4/3 speed increase ratio, or approximately a 25% reduction in power used.

A third example is the all-pass filter. These filters have been shown to be a very effective implementation of other types of filters (see, for example, "Multirate Systems and Filter Banks," by P. P. Vaidyanathan, PTR Prentice-Hall 1993). An example is the formula for a second order all pass section:

$$y_n = a0^*(x_n - y_{n-2}) + a1^*(x_{n-1} - y_{n-1}) + x_{n-2}$$

This evaluation requires 4 MAC operations, but only 2 PMAC operations.

The problem with the pre-adder is that, with a straight forward implementation, the delay caused by the adder before the multiplier will significantly increase the delay of the entire system, negating much of the advantage of the gains in computation by requiring the system to run slower. In a low power system, connecting the output of an adder to the input of a multiplier will increase power dissipation, as there will be more transitions due to the changes in carries. This again will negate the potential power savings.

The simplest conventional multiplier structure is call an array multiplier (See *Principles of CMOS VLSI Design*, by Weste et al., Addison-Wesley 1993, page 545). As an example, to multiply the 6 bit numbers 010011 (19 base 10) and 011100 (28 base 10), the following partial products would be added:

```
         010011   (multiplicand)
         011100   (multiplier)

000000   (partial products)
         000000
         010011
         010011
         010011
         000000

001000010100   (product)
   (532 base 10)
```

This required 6*6 cells, each with an AND gate (the one bit binary multiplier), and an adder. Often a modification to this scheme is used, where two rows of the partial products are handled together.

This requires selecting 0, 1, 2 or 3 times the multiplicand with every 2 bits of the multiplier. These partial factors are generated as follows. The bits of the multiplier are grouped into sets of two bits, starting from the left. Each set of two bits thus has a value of 0, 1, 2, or 3 (base 10). These values are essentially a code, allowing half as many partial products to ultimately be combined. The code is as follows:

Code=0 result is 0
Code=1 result is multiplicand
Code=2 result is multiplicand shifted left one bit( times 2)
Code=3 result is multiplicand, plus multiplicand shifted left one bit For the above example of 19*28,

```
      010011     (multiplicand)
   01 11 00     (multiplier)
    1  3  0     (code, from sets of two bits of multiplier)

(combined partial products)
     0000000    (multiplicand times 0)
     0111001    (multiplicand times 3)
     0010011    (multiplicand times 1)

001000010100   (product)
 (532 base 10)
```

The code=0, 1, or 2 cases can all be handled with a simple multiplexer, in only a few gates. The code=3 case requires additional complex logic, (another complete adder) and therefore this approach is rarely used.

Instead, an approach called Booth Coding is used. The use of Booth coding is prevalent in multiplier design for digital circuits. The logic for the encoder is as follows, where xn+1 and xn are a set of two bits of the multiplier:

| $x_{n+1}$ | $x_n$ | cin | code | cout | |
|---|---|---|---|---|---|
| 0 | 0 | 0 | 0 | 0 | (0 replaced with 0 * 4 + 0) |
| 0 | 1 | 0 | 1 | 0 | (1 replaced with 0 * 4 + 1) |
| 1 | 0 | 0 | −2 | 1 | (2 replaced with 1 * 4 − 2) |
| 1 | 1 | 0 | −1 | 1 | (3 replaced with 1 * 4 − 1) |

-continued

| $x_{n+1}$ | $x_n$ | cin | code | cout | |
|---|---|---|---|---|---|
| 0 | 0 | 1 | 1 | 0 | (1 replaced with 0 * 4 + 1) |
| 0 | 1 | 1 | 2 | 0 | (2 replaced with 0 * 4 + 2) |
| 1 | 0 | 1 | −1 | 1 | (3 replaced with 1 * 4 − 1) |
| 1 | 1 | 1 | 0 | 1 | (4 replaced with 1 * 4 + 0) | cout (carry out) is an output from every 2 bit stage which is connected to the cin (carry in) of the next most significant stage. Therefore carry in has a bit weight of 1, and carry out has a bit weight of 4.

The carry in of the least significant Booth encoding stage is useful for negation. "−a*b" can be produced by complementing all bits on the input to the Booth encoder, and setting the carry in of the least significant stage to a 1.

In base two, two's complement arithmetic, the negative of a number is generated by complementing the number, and adding one. This complementing must be done with enough bits to extend the number far enough left to fill the entire desired result. As it is the sign bit of the operation that is used to fill the extra bits, this operation is referred to as "sign extend".

It is easy to generate codes of −1 and −2, and Booth coding takes advantage of this fact. Five codes are used:

code=−2 result is multiplicand shifted left, complemented, a carry in added code=−1 result is multiplicand complemented, and a carry in added code=0 result is 0 code=1 result is multiplicand code=2 result is multiplicand shifted left one bit In the case shown above, instead of 1, 3, 0 being the code factors, 2, −1, 0 are used. It is easy to see that the results are the same.

| | |
|---|---|
| 010011 | (multiplicand) |
| 01 11 00 | (multiplier) |
| 2 −1 0 | (Booth coding of multiplier) |
| 000000000000 | (multiplicand times 0) |
| 0 | (carry in for positive) |
| 1111101100 | (multiplicand times 1 complemented) |
| 1 | (carry in for negative) |
| 00100110 | (multiplicand times 2) |
| 0 | (carry in for positive) |
| 001000010100 | (product) |
| (532 base 10) | |

In order to create a PMAC using a booth encoder in a straight forward manner, to produce "x=(a+b)*c+d", "a" and "b" would need to be added prior to Booth encoding the result "(a+b)" and multiplying it by "c." The delay caused by implementing an adder prior to the Booth encoding and multiplying step slows down the system so much, it negates the power gains of reducing steps.

A need remains in the art for an integrated pre-adder with a Booth encoder.

SUMMARY OF THE INVENTION

An object of the present invention is to provide an integrated pre-adder and Booth encoder.

An integrated adder and Booth encoder stage combines n bits of a binary number x, n bits of a binary number y, a first carry in signal, and a second carry in signal to generate the Booth code of the sum of the n bits of x, the n bits of y, and the first and second carry in signals. The stage includes a first carry generation block for receiving the n bits of x and the n bits of y, and operating to generate a first set of intermediate signals and a first carry out signal based upon the n bits of x and the n bits of y, a second carry generation block for receiving the first set of intermediate signals and the first carry in signal, and operating to generate a second set of intermediate signals and a second carry out signal based upon the first set of intermediate signals and the first carry in signal, and an output code generation block for receiving the second set of intermediate signals and the second carry in signal, and operating to generate a Booth code based upon the second set of intermediate signals and the second carry in signal.

An integrated adder and booth encoder for combining n+m bits of a binary number x, n+m bits of a binary number y, a first carry in signal, and a second carry in signal to generate Booth codes based on the n+m bits of x, the n+m bits of y, and the first and second carry in signals, includes a lower significant stage and a higher significant stage.

The lower significant stage includes a lower significant first carry generation block, a lower significant second carry generation block, and a lower significant output code generation block. The higher significant stage includes a higher significant first carry generation block, a higher significant second carry generation block for receiving the higher significant first set of intermediate signals and the lower significant first carry out signal, and operating to generate a higher significant second set of intermediate signals and a higher significant second carry out signal, and a higher significant output code generation block for receiving the higher significant second set of intermediate signals and the lower significant second carry out signal, and operating to generate a higher significant Booth code.

As an example, apparatus for receiving input binary numbers x, y, and z and generating the quantity (x+y)*z comprises the integrated adder and booth encoder above, and a Booth multiplier connected to the integrated adder and booth encoder, for receiving z and the Booth code of x+y from the integrated adder and booth encoder, and Booth multiplying z with the Booth code of x+y.

Similarly, apparatus for receiving input binary numbers x, y, z, and xx and generating the quantity (x+y)*z+zz comprises the integrated adder and booth encoder above for receiving x and y and generating the Booth code of x+y, a Booth multiplier connected to the integrated adder and booth encoder, for receiving z and the Booth code of x+y from the integrated adder and booth encoder, and Booth multiplying z with the Booth code of x+y to produce (x+y)*z, and an adder connected to the Booth multiplier, for receiving zz and the quantity (x+y)*z from the Booth encoder, and adding zz to the quantity (x+y)*z to produce the quantity (x+y)*z+zz.

A digital signal processor of the type including a Central Processing Unit (CPU), random access memory connected to the CPU, and read only memory connected to the CPU, is improved by adding a Pre-Add Multiplication Accumulation unit (PMAC) connected to the CPU The PMAC includes the integrated adder and booth encoder above for receiving x and y, and generating the Booth code of x+y, a Booth multiplier connected to the integrated adder and booth encoder, for receiving z and the Booth code of x+y from the integrated adder and Booth encoder, and Booth multiplying z with the Booth code of x+y to produce (x+y)*z, and an adder connected to the Booth multiplier, for receiving zz and the quantity (x+y)*z from the Booth encoder, and adding zz to the quantity (x+y)*z to produce the quantity (x+y)*z+zz.

A hearing aid of the type including an audio receiver to receive ambient sound, an analog to digital (A/D) converter to convert the sound to a high resolution, low rate digital signal, digital processing circuitry to modify the quality of the high resolution, low rate digital signal, interpolator circuitry for converting the high resolution, medium rate digital signal to a medium rate, high resolution signal, a digital to analog (D/A) converter for converting the modified high resolution, medium rate digital signal back into analog sound, has improved digital processing circuitry comprising a Central Processing Unit (CPU), random access memory connected to the CPU, read only memory connected to the CPU, and a Pre-Add Multiplication Accumulation unit (PMAC), as described above, connected to the CPU.

One integrated adder and Booth encoder stage for combining a more significant bit xn+1 and a less significant bit xn of a binary number x with a more significant bit yn+1 and a less significant bit yn of a binary number y and with a first carry in signal and a second carry in signal to generate the Booth code for bit positions n and n+1, comprises a first carry generation block for receiving xn, yn, xn+1 and yn+1, and operating to generate a first carry out signal and a first set of intermediate signals, a second carry generation block for receiving the first set of intermediate signals and the first carry in signal, and operating to generate a second carry out signal and a second set of intermediate signals, and an output code generation block for receiving the second set of intermediate signals and the second carry in signal, and operating to generate a Booth code based upon the second set of intermediate signals and the second carry in signal.

This integrated adder and Booth encoder stage may also have the first carry generation block including means for providing yn+1 as the first carry out and means for providing yn+1, xn+1 inverted, yn, and xn as the first set of intermediate signals, and the second carry generator including a least significant adder for adding xn, yn, and the first carry in; and providing sum and carry inverted outputs, and a most significant adder for adding yn+1, xn+1 inverted, and the carry from the least significant adder and providing sum and carry inverted outputs, and the carry inverted output of the most significant adder is the second carry out, and the sum outputs from the most significant adder and the least significant adder are the second set of intermediate signals.

Alternatively, this integrated adder and Booth encoder stage might have the first carry generation block including means for providing xn+1 AND yn+1 as the first carry out and means for providing yn+1, xn+1, yn, and xn as the first set of intermediate signals, and the second carry generator including an adder for adding xn, yn, and the first carry in; and providing sum and carry outputs, and a first XOR gate connected to the first carry generation block for providing the logical XOR of xn+1 and yn+1, a second XNOR gate connected to the first XOR gate and the adder for providing the logical XOR of the output of the first XOR gate and the carry output of the adder, and an OR gate connected to the first XOR gate and the adder for providing the logical OR of the output of the first XOR gate and the carry output of the adder, and the output of the OR gate is the second carry out, and the sum output from the adder and output of the second XOR are the second set of intermediate signals.

Alternatively, this integrated adder and Booth encoder stage might have the first carry generation block including means for providing xn+1 OR yn+1 as the first carry out and means for providing yn+1, xn+1, yn, and xn as the first set of intermediate signals, and the second carry generator including an adder for adding xn, yn, and the first carry in; and providing sum and carry outputs, and a first XNOR gate connected to the first carry generation block for providing the logical XNOR of xn+1 and yn+1, a second XNOR gate connected to the first XNOR gate and the adder for providing the logical XNOR of the output of the first XNOR gate and the carry output of the adder, and an AND gate connected to the first XNOR gate and the adder for providing the logical AND of the output of the first XNOR gate and the carry output of the adder, and wherein the output of the AND gate is the second carry out, and the sum output from the adder and the output of the second XNOR are the second set of intermediate signals.

A multiple stage adder and booth encoder for adding a multiple bit number x and a multiple bit number y comprises a plurality of any of the stages described above, and is structured so that a first of the stages, designated the lowest significant stage receives x0, x1, y0, y1, the first carry in and the second carry in, this lowest significant stage operating to generate a lowest significant Booth code, and a second of the stages, designated the second lowest significant stage receives x2, x3, y2, y3, the lowest significant first carry out and the lowest significant second carry out, this second lowest significant stage operating to generate a lowest significant Booth code, and each succeeding stage receives the next two lowest significant bits available of x and y and the first and second carry out from the previous stage, and operates to generate a Booth code based on the next two bits of x and y and the first and second carry outs from the previous stage, and to generate a first carry out and a second carry.

DETAILED DESCRIPTION OF THE PREFERRED EMBODIMENT

Figure 1:
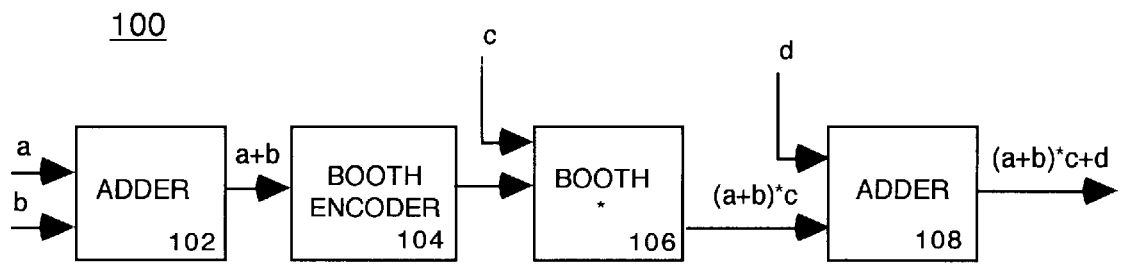
FIG. 1 (prior art) shows a block diagram of a PMAC which provides an adder prior to a Booth encoder.

FIG. 1 (prior art) shows a block diagram of a pre-add multiplication accumulation unit (PMAC) 100 which provides an adder 102 prior to a Booth encoder 104, in a conventional manner. Recall that a PMAC returns the result x=(a+b)*c+d. PMAC 100 operates as follows. If "a" and "b" are input into adder 102, "a+b" is the output. Booth encoder 104 Booth encodes "a+b", and Booth multiplier 106 Booth multiplies the Booth code for "a+b" together with input "c", resulting in "(a+b)*c". Finally, adder 108 adds input "d", producing the final result of (a+b)*c+d.

Figure 2:
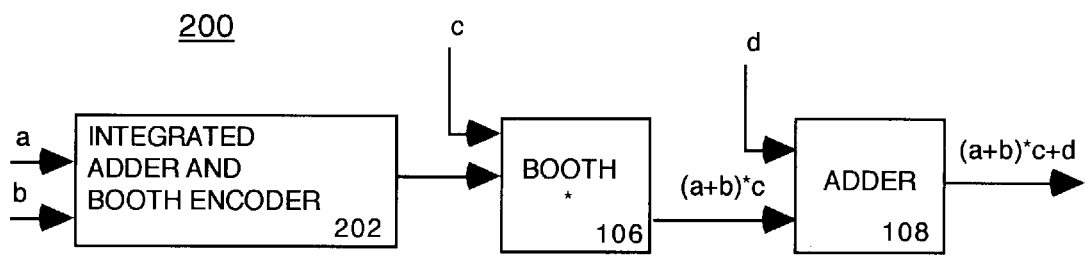
FIG. 2 s a block diagram of a PMAC according to the present invention which integrates an adder with a Booth encoder.

FIG. 2 shows a block diagram of a PMAC 200, according to the present invention which provides an integrated adder and Booth encoder 202. Identical reference numbers indicate identical functions. Integrated adder and Booth encoder 202 provides the Booth code for the sum of "a+b" to Booth multiplier 106, which Booth multiplies the Booth code with input c, producing "(a+b)*c". Adder 108 adds input "d", resulting in the final result of (a+b)*c+d. Three preferred embodiments of integrated adder and Booth encoder 202 are shown in FIGS. 4, 8 and 9.

Figure 3:
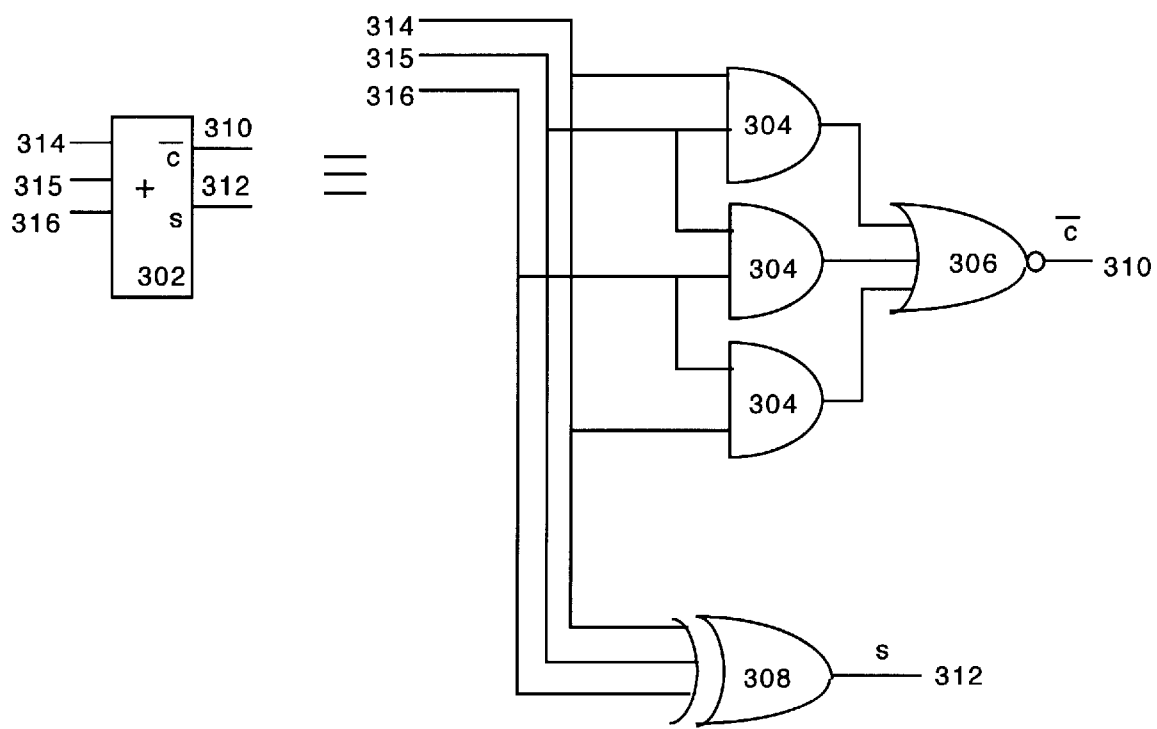
FIG. 3 (prior art) shows a circuit diagram of a conventional full adder, with a true sum output and a complemented carry output.

FIG. 3 (prior art) shows a circuit diagram of a conventional full adder 302. An understanding of this device is helpful in understanding the structure and operation of combined adder and Booth encoder 202 of FIG. 2, shown in more detail in FIG. 4B. Adder 302 may be replaced with a variety of other adders, but must be composed of purely combinatorial elements. Adder 302 has three inputs 314, 315, and 316, and outputs a sum bit s, 312 and a complemented carry bit c bar, 310. This carry out is the complement of the carry out of a standard full adder. As shown in FIG. 3, the sum bit 312 is one only when an odd number of the inputs are one, since it the output of a three input exclusive or (XOR) gate 308. The carry not (or carry bar, in typical notation) bit is one only if either none or only one of the inputs is 1, since if the outputs of any of the AND gates 304 is one, then the output of the NOR gate 310 is zero. Thus, the truth table of full adder 302 is as follows (where carry c is shown for convenience):

| inputs | c̄ | s | c |
|---|---|---|---|
| 0 0 0 | 1 | 0 | 0 |
| 0 0 1 | 1 | 1 | 0 |
| 0 1 0 | 1 | 1 | 0 |
| 0 1 1 | 0 | 0 | 1 |
| 1 0 0 | 1 | 1 | 0 |
| 1 0 1 | 0 | 0 | 1 |
| 1 1 0 | 0 | 0 | 1 |
| 1 1 1 | 0 | 1 | 1 |

Figure 4A:
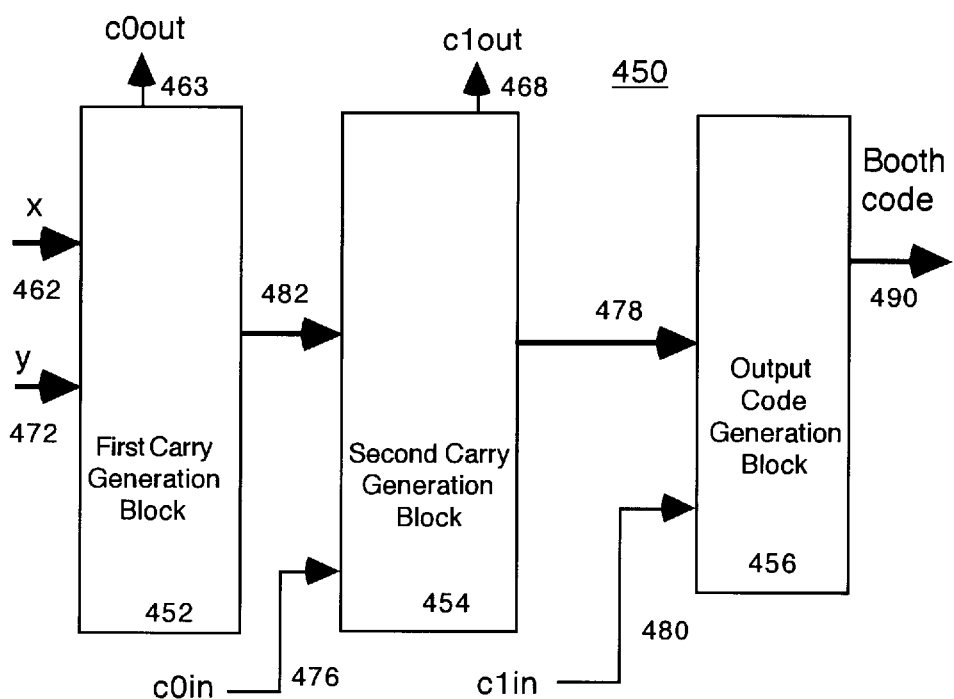
FIG. 4A shows a block diagram of a single stage of a combined adder and Booth encoder according to the present invention.

FIG. 4A shows a block diagram of a single stage 450 of a combined adder and Booth encoder 202 according to the present invention. Stage 450 comprises three blocks, a first carry generation block 452, a second carry generation block 454, and an output code generation block 456. x input bits 462 and y input bits 472 are multiple bits (generally two bits) of numbers x and y which are input into first carry block 452. Block 452 generates first carry out c0out 463 and multibit signal 482, which generally comprises x inputs 462 and y inputs 472 carried straight through, or only slightly modified.

Multibit signal 482 and first carry in signal c0in 476 are inputs to second carry generation block 454. Generally, c0in 476 is the c0out signal 463 of another stage 450 which is adding less significant bits than the present stage. If the present stage 450 is adding the least significant bits, c0in 463 might represent a sign bit or other information. Block 454 generates second carry out bit c1out 468 and multibit signal 478. Multibit signal 478 generally comprises bits of x input 462 added, or otherwise combined with bits of y input 472.

Multibit signal 478 and second carry in signal c1in 480 are inputs to code generation block 456. Generally, c1in 480 is the c1out signal 468 of another stage 450 which is adding less significant bits. If the present stage 450 is adding the least significant bits, c1in 480 might represent sign bits or other information. Block 456 generates the Booth code 490 of multibit signal 478, or x input 462 added to y input 472, accounting for carry ins 476 and 480. Block 456, like all of stage 450, comprises unclocked, combinatorial logic, and x input bits 462 and y input bits 472 are input all at once in parallel.

The most important feature of stage 450 is that the first carry, c0out 463, is only dependent upon x input 462 and y input 472. It is not dependent upon c0in 476 or c1in 480. Similarly, c1out 468 is only dependent upon x input 462, y input 472, and c0in 476. It is not dependent upon c1in. This is important because it means that the worst case delay of combined adder/Booth encoder 202 is small, and does not depend upon the number of stages 450. This will be seen more clearly by considering multistage adder/Booth encoder 500, shown in FIG. 5.

Figure 4B:
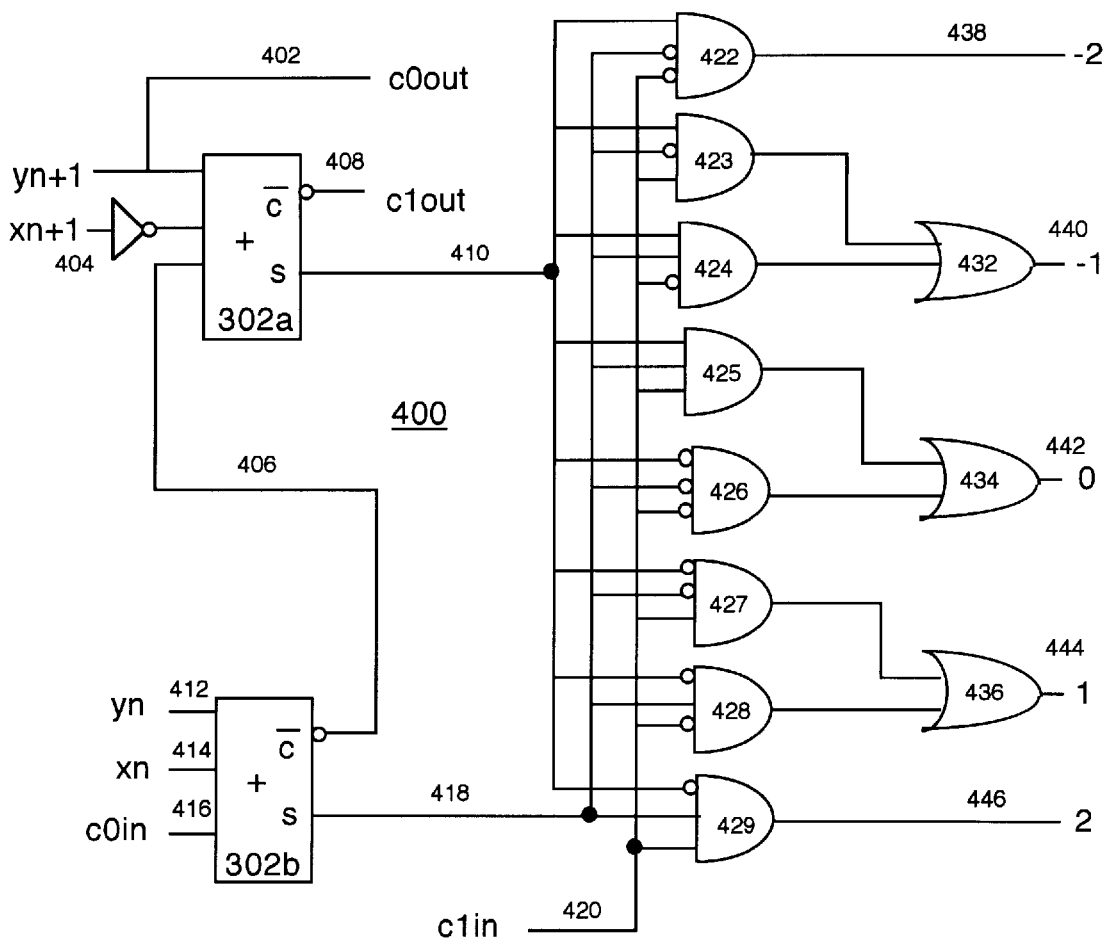
FIG. 4B shows a circuit diagram of the first preferred embodiment of a single stage of the combined adder and Booth encoder of FIG. 4A.

FIG. 4B shows a circuit diagram 400 of the first preferred embodiment of one stage 450 of combined adder and Booth encoder 202. Other preferred embodiments are shown in FIGS. 8 and 9.

Figure 4C:
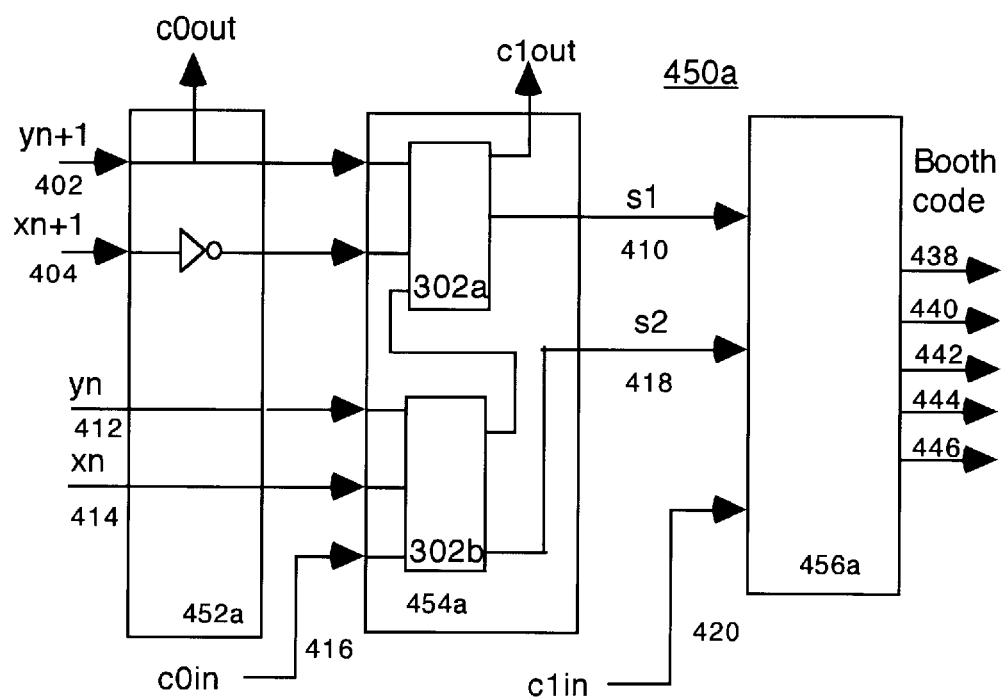
FIG. 4C shows the relationship between 4A and 4B.

The function table of adder/Booth encoder stage 400 is shown below. Binary numbers x and y are to be Booth encoded and added by adder/encoder 202, of which circuit 400 is a stage handling two bits each of x and y. Thus, stage 400 is a special case of stage 450 of FIG. 4A. xn 414 and yn 412 are the least significant bits of the two bits handled by this stage. xn+1 404 and yn+1 402 are the most significant bits. c0in 416 and c1in 420 are carry in inputs as shown in FIG. 4A. FIG. 4C further illustrates the relationship between FIG. 4A and FIG. 4B.

For every two bits of x and y, the following function tables define the code which is generated. The signal t0 is used to explain the connection of the first table to the second table; otherwise a very large (64 line) table must be used to describe the logical operation. Such a signal as t0 may, or may not, be created in the actual circuit implementation:

| 404 $x_{n+1}$ | 402 $y_{n+1}$ | 416 c0in | t0 | 402 c0out |
|---|---|---|---|---|
| 0 | 0 | 0 | 0 | 0 |
| 1 | 0 | 0 | 2 | 0 |
| 0 | 1 | 0 | −2 | 1 |
| 1 | 1 | 0 | 0 | 1 |
| 0 | 0 | 1 | 1 | 0 |
| 1 | 0 | 1 | 3 | 0 |
| 0 | 1 | 1 | −1 | 1 |
| 1 | 1 | 1 | 1 | 1 |

| $t0 + x_n + y_n$ | 420 c1in | code | 408 c1out |
|---|---|---|---|
| −2 | 0 | −2 | 0 |
| −1 | 0 | −1 | 0 |
| 0 | 0 | 0 | 0 |
| 1 | 0 | 1 | 0 |
| 2 | 0 | −2 | 1 |
| 3 | 0 | −1 | 1 |

-continued

| | | | |
|---|---|---|---|
| 4 | 0 | 0 | 1 |
| 5 | 0 | 1 | 1 |
| −2 | 1 | −1 | 0 |
| −1 | 1 | 0 | 0 |
| 0 | 1 | 1 | 0 |
| 1 | 1 | 2 | 0 |
| 2 | 1 | −1 | 1 |
| 3 | 1 | 0 | 1 |
| 4 | 1 | 1 | 1 |
| 5 | 1 | 2 | 1 |

As an example, if $x_{n+1}=0$, $x_n=1$, $y_{n+1}=1$, $y_n=0$, c0in=0, c1in=0, we would find t0=−2 from the first table, t0+$x_n$+$y_n$=−1, and the code is −1 from the second table.

FIG. 4B shows the preferred embodiment of circuitry to implement this logic function. The two sum outputs of the full adders, 410 (from high order adder 302a) and 418 (from low order adder 302b) encode the following value. The value allows a numeric description of the logical operation:

| 410 | 418 | value |
|---|---|---|
| 0 | 0 | 0 |
| 0 | 1 | 1 |
| 1 | 0 | −2 |
| 1 | 1 | −1 |

The value created can be mathematically described as:

value=−2*(410)+1*(418)

By the logic function described, the following equations are satisfied:

$$\text{value} + 4 * (c1out) = (c0in) + (xn) + (yn) + 2 * [(xn + 1) - (yn + 1)] \quad (1)$$

$$c0out = (yn + 1) \quad (2)$$

$$\text{total} = \text{value} + 4 * [(c1out) + (c1out)] = \quad (3)$$

$$(c0in) + (xn) + (yn) + 2 * [(xn + 1) + (yn + 1)]$$

This last equation is the one that guarantees that the proper code is generated, and shows the equivalence of the values generated by this encoder to the select sum of x and y.

The function of the inverters and the two full adders can be enumerated as follows:

(406 is the carry not out of adder 302b feeding adder 302a)

| 404 xn + 1 | 402 yn + 1 | 414 xn | 412 yn | 416 c0in | 406 | 410 s1 | 418 s2 | 402 c0out | 408 c1out | total |
|---|---|---|---|---|---|---|---|---|---|---|
| 0 | 0 | 0 | 0 | 0 | 1 | 0 | 0 | 0 | 0 | 0 |
| 0 | 0 | 0 | 0 | 1 | 1 | 0 | 1 | 0 | 0 | 1 |
| 0 | 0 | 0 | 1 | 0 | 1 | 0 | 1 | 0 | 0 | 1 |
| 0 | 0 | 0 | 1 | 1 | 0 | 1 | 0 | 0 | 1 | 2 |
| 0 | 0 | 1 | 0 | 0 | 1 | 0 | 1 | 0 | 0 | 1 |
| 0 | 0 | 1 | 0 | 1 | 0 | 1 | 0 | 0 | 1 | 2 |
| 0 | 0 | 1 | 1 | 0 | 0 | 1 | 0 | 0 | 1 | 2 |
| 0 | 0 | 1 | 1 | 1 | 0 | 1 | 1 | 0 | 1 | 3 |
| 0 | 1 | 0 | 0 | 0 | 1 | 1 | 0 | 1 | 0 | 2 |
| 0 | 1 | 0 | 0 | 1 | 1 | 1 | 1 | 1 | 0 | 3 |
| 0 | 1 | 0 | 1 | 0 | 1 | 1 | 1 | 1 | 0 | 3 |
| 0 | 1 | 0 | 1 | 1 | 0 | 0 | 0 | 1 | 0 | 4 |
| 0 | 1 | 1 | 0 | 0 | 1 | 1 | 1 | 1 | 0 | 3 |
| 0 | 1 | 1 | 0 | 1 | 0 | 0 | 0 | 1 | 0 | 4 |
| 0 | 1 | 1 | 1 | 0 | 0 | 0 | 0 | 1 | 0 | 4 |
| 0 | 1 | 1 | 1 | 1 | 0 | 0 | 1 | 1 | 0 | 5 |
| 1 | 0 | 0 | 0 | 0 | 1 | 1 | 0 | 0 | 1 | 2 |
| 1 | 0 | 0 | 0 | 1 | 1 | 1 | 1 | 0 | 1 | 3 |
| 1 | 0 | 0 | 1 | 0 | 1 | 1 | 1 | 0 | 1 | 3 |
| 1 | 0 | 0 | 1 | 1 | 0 | 0 | 0 | 0 | 1 | 4 |
| 1 | 0 | 1 | 0 | 0 | 1 | 1 | 1 | 0 | 1 | 3 |
| 1 | 0 | 1 | 0 | 1 | 0 | 0 | 0 | 0 | 1 | 4 |
| 1 | 0 | 1 | 1 | 0 | 0 | 0 | 0 | 0 | 1 | 4 |
| 1 | 0 | 1 | 1 | 1 | 0 | 0 | 1 | 0 | 1 | 5 |
| 1 | 1 | 0 | 0 | 0 | 1 | 0 | 0 | 1 | 0 | 4 |
| 1 | 1 | 0 | 0 | 1 | 1 | 0 | 1 | 1 | 0 | 5 |
| 1 | 1 | 0 | 1 | 0 | 1 | 0 | 1 | 1 | 0 | 5 |
| 1 | 1 | 0 | 1 | 1 | 0 | 1 | 0 | 1 | 1 | 6 |
| 1 | 1 | 1 | 0 | 0 | 1 | 0 | 1 | 1 | 0 | 5 |
| 1 | 1 | 1 | 0 | 1 | 0 | 1 | 0 | 1 | 1 | 6 |
| 1 | 1 | 1 | 1 | 0 | 0 | 1 | 0 | 1 | 1 | 6 |
| 1 | 1 | 1 | 1 | 1 | 0 | 1 | 1 | 1 | 1 | 7 | total is the value from above equation (3), which is a sum of the equivalent input values.

The output and/or stage, comprising ANDs 422–429 with selected inputs inverted as shown and ORs 432, 434 and 436, implements the following functions:

| (inputs) | | | (outputs) | | | | | | |
|---|---|---|---|---|---|---|---|---|---|
| 410 | 418 | 420 c1in | 438 −2 | 440 −1 | 442 0 | 444 1 | 446 2 | (value) | (value + c1in) |
| 1 | 0 | 0 | 1 | 0 | 0 | 0 | 0 | −2 | −2 |
| 1 | 0 | 1 | 0 | 1 | 0 | 0 | 0 | −2 | −1 |
| 1 | 1 | 0 | 0 | 1 | 0 | 0 | 0 | −1 | −1 |
| 1 | 1 | 1 | 0 | 0 | 1 | 0 | 0 | −1 | 0 |
| 0 | 0 | 0 | 0 | 0 | 1 | 0 | 0 | 0 | 0 |
| 0 | 0 | 1 | 0 | 0 | 0 | 1 | 0 | 0 | 1 |
| 0 | 1 | 0 | 0 | 0 | 0 | 1 | 0 | 1 | 1 |
| 0 | 1 | 1 | 0 | 0 | 0 | 0 | 1 | 1 | 2 |

It can be seen that value+c1in matches the coding of the output.

Depending upon the design of the multiplier structure of block 106, other output codes may be more desirable, such as a +/− flag and a 0, 1, 2 indicator. This can easily be accomplished by re-arrangement of the and/or stage, as one familiar with logic will see.

It is often necessary to form negative products, or use a difference instead of an add. This proposed structure easily allows for the negation of input terms, as there are two carry inputs to the least significant stage. (a+b)*c, (a−b)*c, (−a+b)*c, and (−a−b)*c can be all created by appropriately complementing the a and b inputs, and setting one each of the carry ins to the least significant stage for each of the Booth encoder, for any input which should be treated as a negative. (One of the carry inputs is allocated to use for x negation, the other for y negations)

Figure 5:
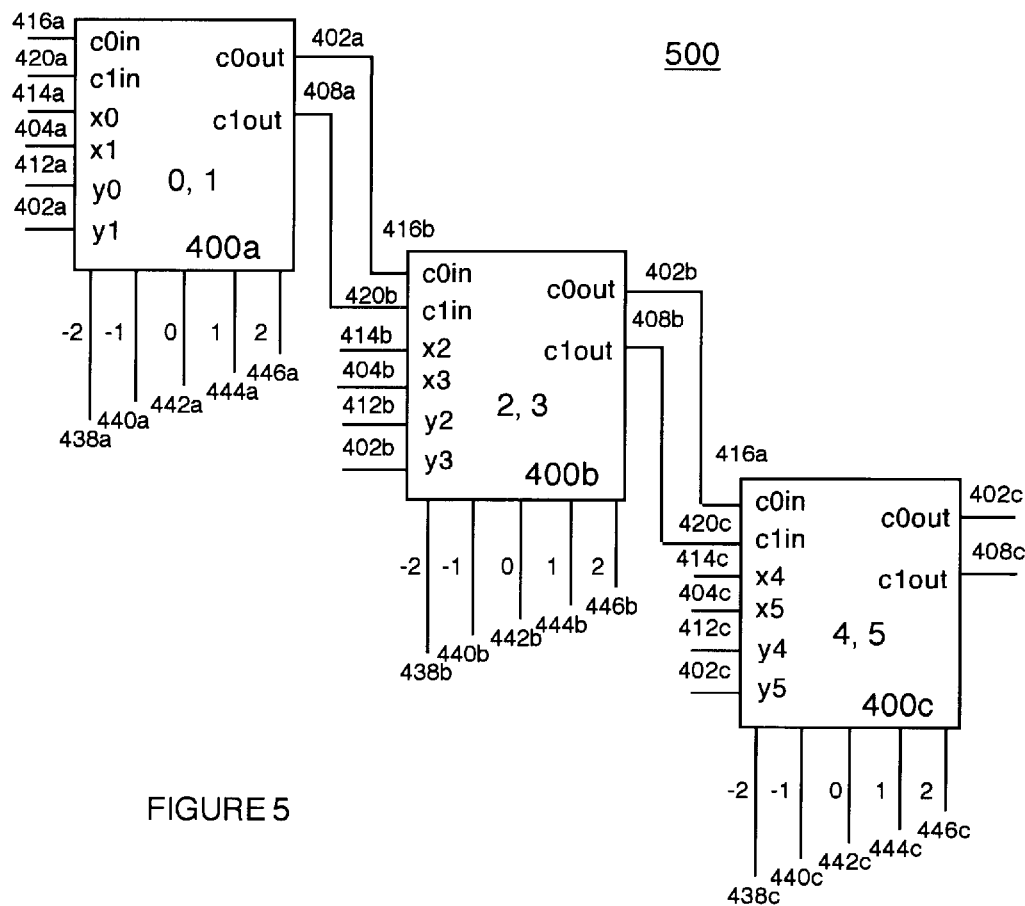
FIG. 5 shows a six bit combined adder and Booth encoder in accordance with the present invention.
Figure 8A:
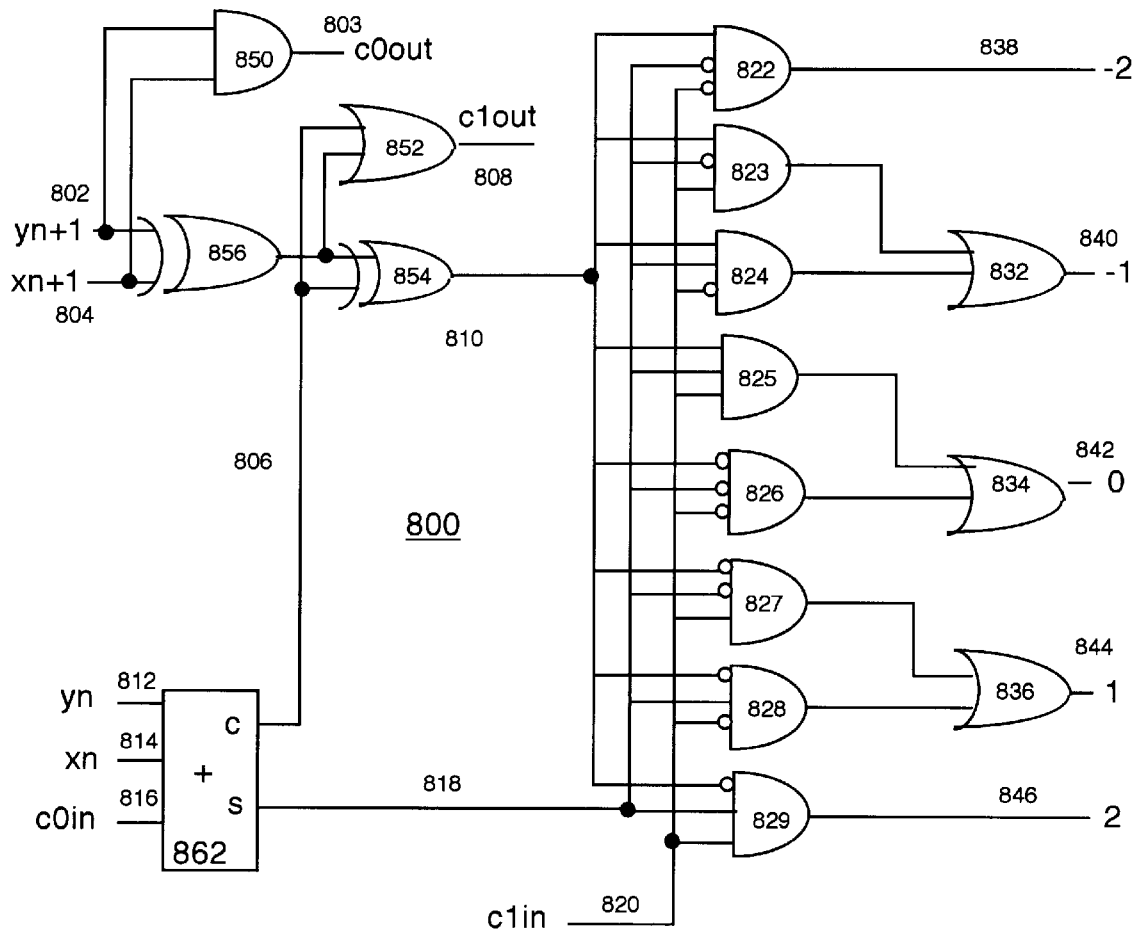
FIG. 8A shows a circuit diagram of the second preferred embodiment of a single stage of the combined adder and Booth encoder of FIG. 4A.
Figure 9A:
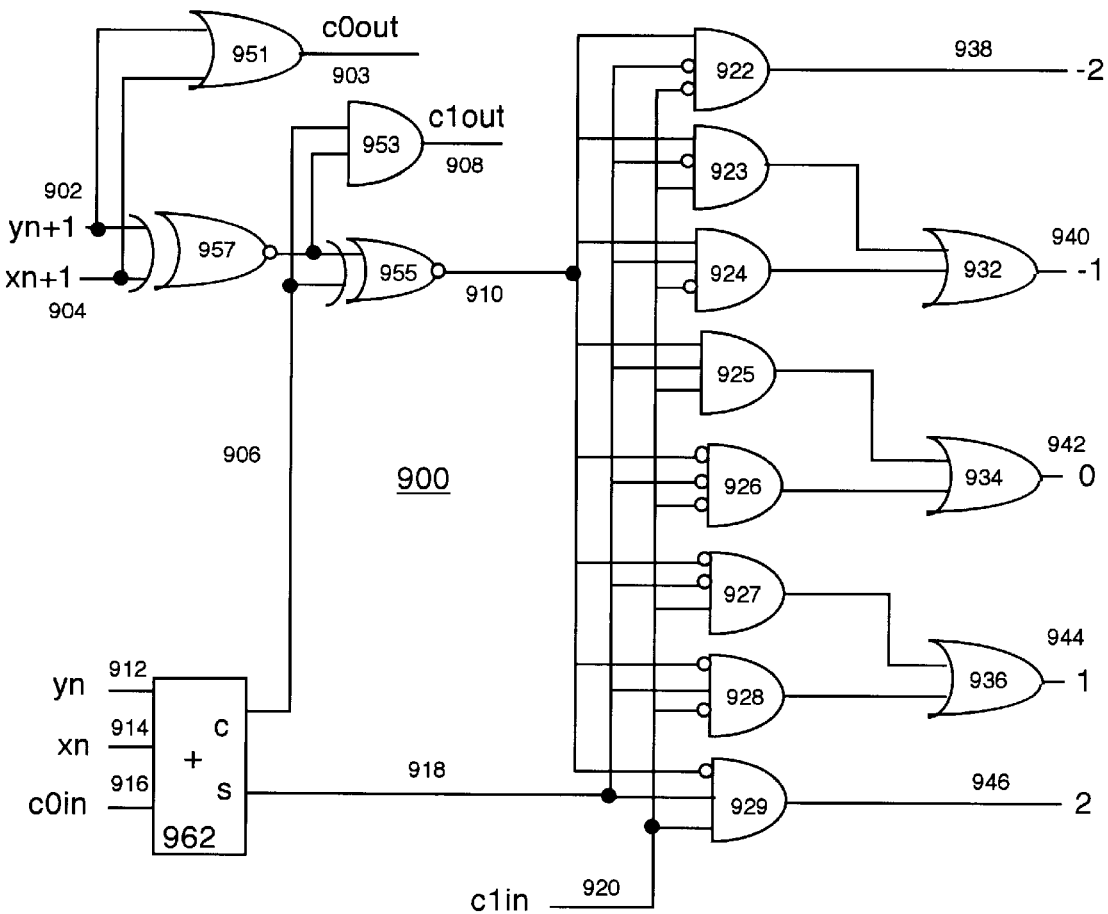
FIG. 9A shows a circuit diagram of the third preferred embodiment of a single stage of the combined adder and Booth encoder of FIG. 4A.

An integrated adder/Booth encoder 202 will be built out of stages like 400, normally one for every two bits, as shown in FIG. 5. It is possible to extend the concept to more than two bits, but because of the complexity of the multiplier array created, this is not normally a good tradeoff. The construction of each of the two bit stages may be as shown in FIG. 4B, FIG. 8A, or FIG. 9A, or many other variations. The key concept to this invention is that each two bit stage is connected to the next greater significant stage with two carry signals, and that each of the carry outputs is not dependent on the corresponding carry input. This condition insures that carry propagation does not occur, and that the input adder will not significantly increase delay or power dissipation.

FIG. 4C shows the relationship between the block diagram of FIG. 4A and the circuitry of FIG. 4B. Thus, block 452a merely carries through xn 414 and yn 412, carries through yn+1 402, while also using it as c0out 402, and inverts xn+1 404. Block 454a adds xn 414 to yn 412 and c0in 416 in adder 302b, adds inverted xn+1 404 to yn+1 402 and carry bar 406 from 302b in adder 302a, provides sum1 410 and sum2 418 to block 456, and provides the carry bar signal from adder 302a as c1out 408. Block 456a comprises ANDs 422–429 and ORs 432, 434, and 436 as shown in FIG. 4B, and outputs the Booth code on lines 438, 440, 442, 444, and 446.

FIG. 5 shows a preferred embodiment of an integrated adder and Booth encoder 202, for adding and Booth encoding 6 digit binary numbers. It comprises three stages, 400a, 400b, and 400c, of adding and Booth encoding. 400a adds and Booth encodes x0 and x1 with y0 and y1. 400b adds and Booth encodes x2 and x3 with y2 and y3. 400c adds and Booth encodes x4 and x5 with y4 and y5. As shown, the inputs to 400a are x0 414a, x1 404a, y0 412a and y1 402a. c0in 416a and c1in 420a are available to negate the operands, as previously described. 400b has as its inputs x2 414b, x3 404b, y2 412b and y3 402b. c0in 416b is c0out 402a from stage 400a. c1in 420b is c1out 408a from stage 400a. 400c has as its inputs x4 414c, x5 404c, y4 412c and y5 402c. c0in 416c is c0out 402b from stage 400b. c0in 420c is c1out 408b from stage 400b. c0out 402c and c1out 408c are normally not used.

There are several ways to build adder/encoder stages equivalent to stages 400; two more are shown in FIGS. 8A and 9A. The implementations differ in how the generation of carries is shared between the two carry outputs. Key to all the designs is that the generation of a carry out is not dependent on the corresponding carry in. It is this fact that allows us to solve the problem of the separate adder I encoder, that of a propagation of a carry signal. To illustrate this concept, compare FIG. 6, showing an adder/Booth encoder/Booth multiplier made up of conventional blocks, with a combined adder and Booth encoder/multiplier as shown in FIG. 7.

Figure 6:
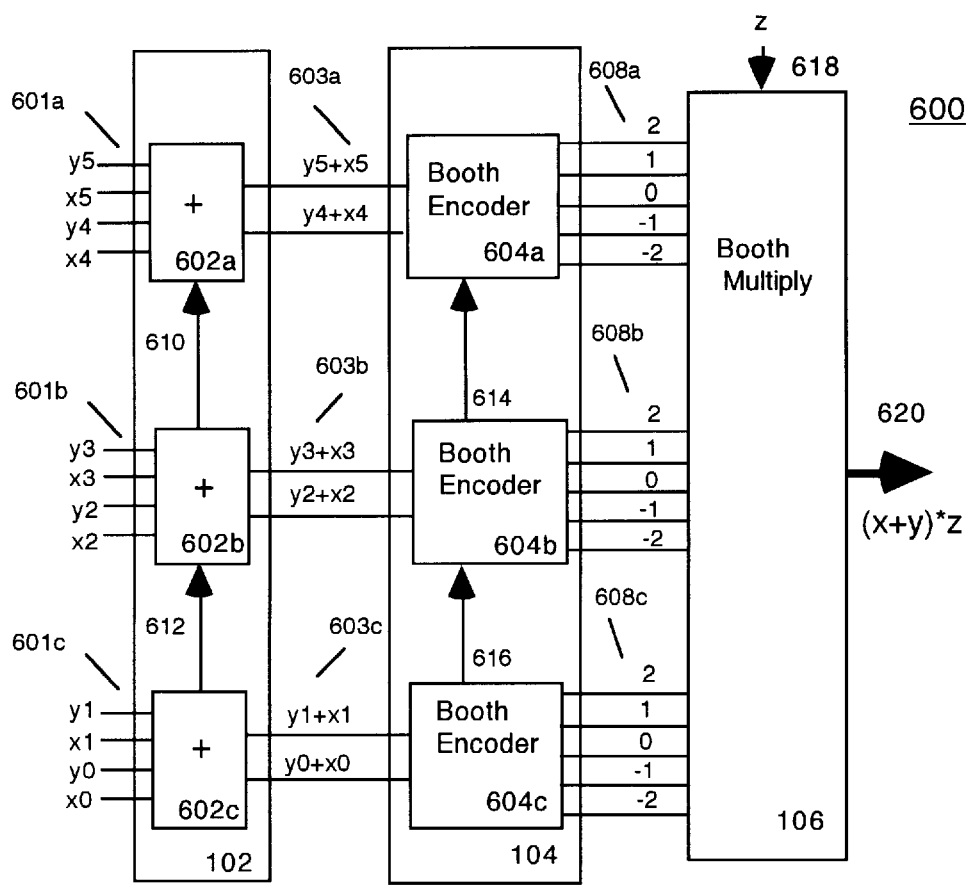
FIG. 6 shows a six-bit adder/Booth encoder/Booth multiplier using conventional blocks.

In FIG. 6, conventional two bit adder 102 comprises adder 602a, which adds binary digits y5, x5, y4, x4 (signals 601a). Similarly, adders 602b and 602c add bits y3, x3, y2, x2 (signals 601b) and y1, x1, y0, x0 (signals 601c) respectively. Note that carry 612, generated by the addition performed by adder 602c, must be passed to adder 602b before 602b can add its digits. Similarly, 602b must complete its addition and generate carry 610 before adder 602a can add its digits. Thus, a delay is produced which increases with each new stage of addition.

The results from adders 602a, 602b, and 602c are signals 603a, 603b, and 603c, which are passed on to conventional Booth encoder 104, comprising encoder blocks 604a, 604b, and 604c, respectively. The Booth code of each encoder is indicated to Booth multiplier 106 on lines 608a, 608b and 608c. Booth multiplier 106, Booth multiplies the Booth code for "x+y" by z (input 618) to produce output 620 ("(x+y) *z").

Figure 7:
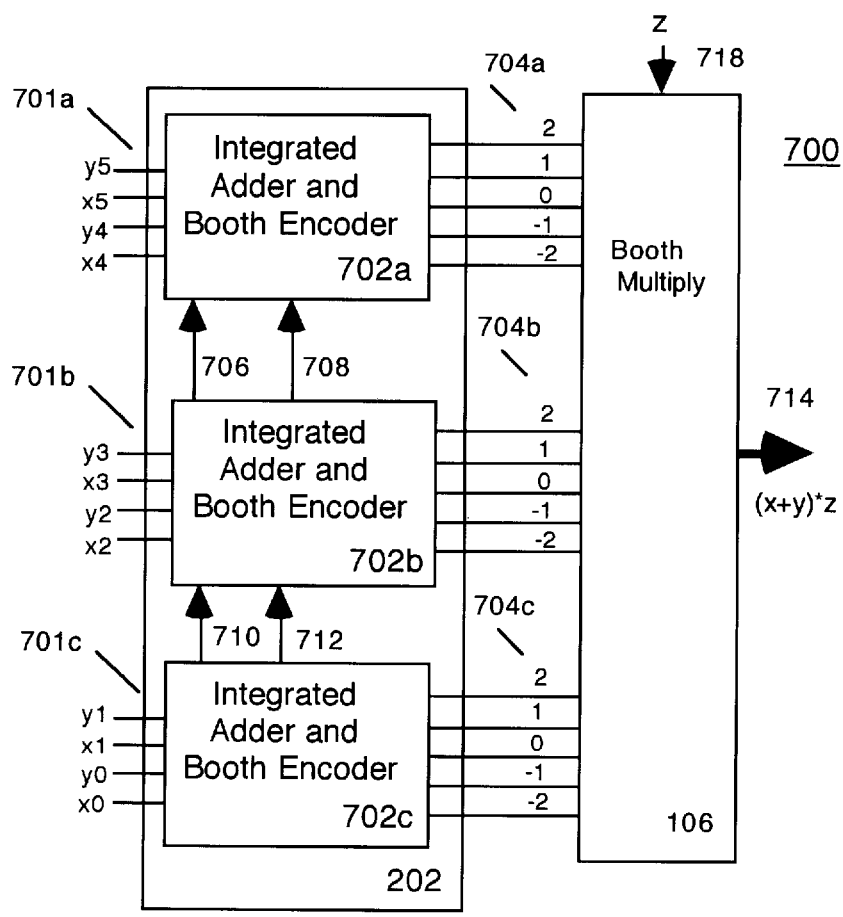
FIG. 7 shows a six-bit combined adder/Booth encoder/ Booth multiplier in accordance with the present invention.

FIG. 7 shows the combination of a Booth adder and encoder 202 comprising three combined adder and Booth encoders 702a, 702b, and 702c, with conventional Booth multiplier 106. Combined adder and Booth encoders 702a, 702b, and 702c could be the combined adder and Booth encoders 400 shown in FIG. 4, or other combined adder and Booth encoders according to the present invention. Combined adder and Booth encoders 702a, 702b, and 702c have as their inputs 701a, 701b, and 701c, comprising y5, x5, y4, x4, and y3, x3, y2, x2, and y1, x1, y0, x0 respectively. Carries 710 and 712 are passed from 702c to 702b, and carries 706 and 708 are passed from 702b to 702a. Note, however, that carry 706 (c0out of block 702b/c0in of block 702a) is not dependent on carry 710 (c0out of block 702c/c0in of block 702b) or 712 (c1out of block 702c/c1in of block 702b). Carry 708 (c1out of block 702b/c1in of block 702a) is dependent only on carry 710.

The outputs of combined adder and Booth encoders 702a, 702b, and 702c are Booth codes for the additions indicated by lines 704a, 704b and 704c. Booth multiplier 106 Booth multiplies the Booth code for "x+y" by z (input 718) to produce output 714 ("(x+y)*z").

Figure 8B:
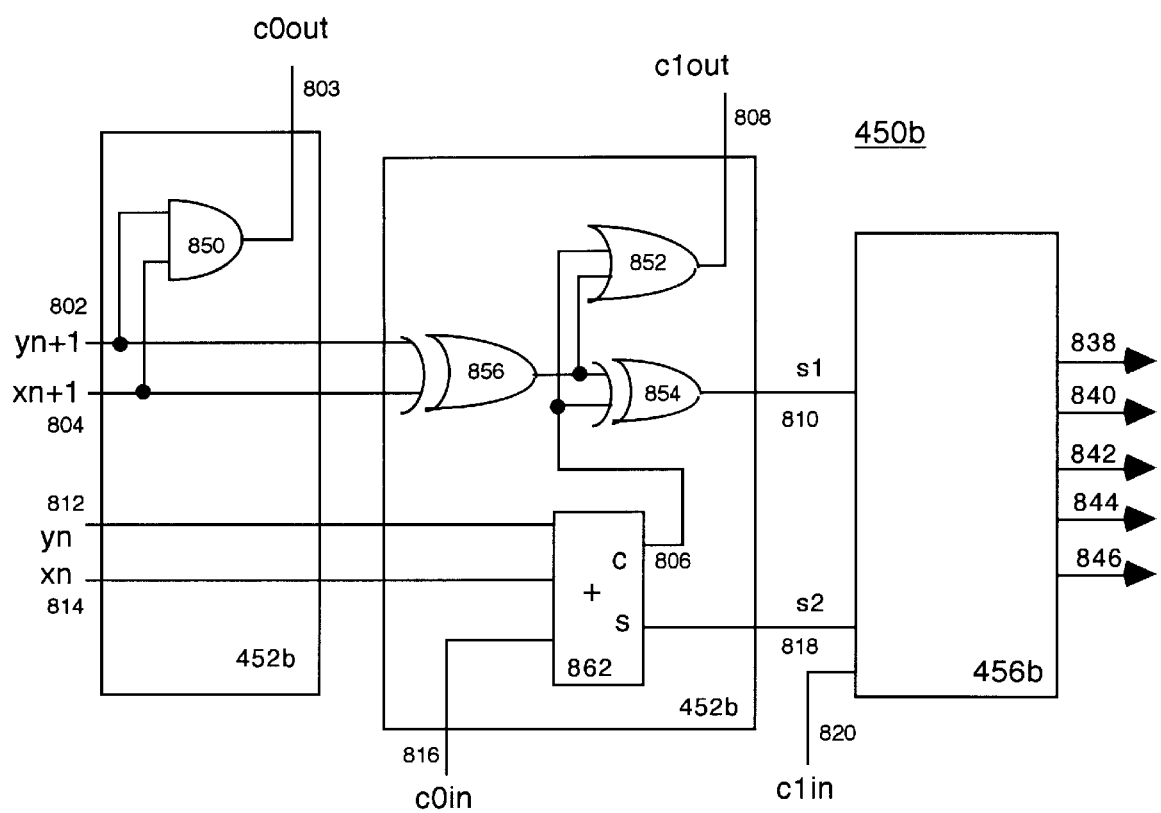
FIG. 8B is a block diagram representation of FIG. 8A.

FIG. 8A shows a second embodiment of a combined adder/Booth encoder stage 800. The function table is as given below. Assume again that we are adding and Booth encoding x and y. For every two bits of x and y, the following coding will be done. In this embodiment, a carry 0 out (c0out 803) will be generated if both of the high order input bits (yn+1 802 and xn+1 804) is one. Adder 862 is similar to adder 302, except that the carry is not inverted. The circuitry comprising XORs 854 and 856 and OR 852 replaces adder 302a. AND 850 has been added to the first carry generation block 452b, as shown in FIG. 8B. Coding block 456B, comprising ANDs 822–827 and ORs 832, 834, and 836 is identical to coding block 456a of FIG. 4B. Again, the signal t0 is a parameter that is used to explain the connection of the first table to the second table:

| 804 $x_{n+1}$ | 802 $y_{n+1}$ | 816 c0in | t0 | 803 c0out |
|---|---|---|---|---|
| 0 | 0 | 0 | 0 | 0 |
| 1 | 0 | 0 | 2 | 0 |
| 0 | 1 | 0 | 2 | 1 |
| 1 | 1 | 0 | 0 | 1 |
| 0 | 0 | 1 | 1 | 0 |
| 1 | 0 | 1 | 3 | 0 |
| 0 | 1 | 1 | 3 | 0 |
| 1 | 1 | 1 | 1 | 1 |

| $t0 + x_n + y_n$ | 820 c1in | code | 808 c1out |
|---|---|---|---|
| 0 | 0 | 0 | 0 |
| 1 | 0 | 1 | 0 |
| 2 | 0 | -2 | 1 |
| 3 | 0 | -1 | 1 |
| 4 | 0 | 0 | 1 |
| 5 | 0 | 1 | 1 |
| 0 | 1 | 1 | 0 |
| 1 | 1 | 2 | 0 |
| 2 | 1 | -1 | 1 |
| 3 | 1 | 0 | 1 |
| 4 | 1 | 1 | 1 |
| 5 | 1 | 2 | 1 |

Again, in order to form a multiple bit adder/Booth encoder 202, several stages 800 are strung together. The c0out 803 of each stage is connected to the c0in 816 of the next stage, and the c1out 808 is connected to the c1in 820 of the next stage.

This effectively integrates the two operations. The carry out signals are not dependent on the corresponding carry in signals. This guarantees that no carry propagation will happen, and that the delay due to the pre adder will be small and independent of the size of the PMAC unit. This property is the key to the invention, in effect, the encoding stage is used to "soak up" and eliminate the carry propagation.

FIG. 8B shows the circuitry of FIG. 8A in block diagram form, in the format of FIG. 4A. First carry generation block 452b passes xn 814, yn 812, xn+1 804 and yn+1 802 unchanged to second carry generation block 452b. xn+1 804 and yn+1 802 are ANDed to form c0out 803.

Second carry generation block 452b adds xn 814 and yn 812 to form sum2 818 and carry2 806. XORs 856 and 854 combine xn+1 804 and yn+1 802 with carry2 806 from adder 862 to form sum1 810. XOR 856 and OR 852 combine xn+1 804 and yn+1 802 with carry2 806 from adder 862 to form c1out 808.

Output code generation block 456b is identical to coding block 456a of FIG. 4C. Coding block 456b combines sum1 810, sum2 818 and c1in 820 and determines the Booth code of sum1 810 and sum2 818, taking into account carry c1in 820.

FIG. 9A shows a third embodiment of combined adder and Booth encoder stage, 900. This embodiment generates c0 when either xn+1 or yn+1 is true.

| 904 $x_{n+1}$ | 902 $y_{n+1}$ | 916 c0in | t0 | 903 c0out |
|---|---|---|---|---|
| 0 | 0 | 0 | 0 | 0 |
| 1 | 0 | 0 | -2 | 0 |
| 0 | 1 | 0 | -2 | 1 |
| 1 | 1 | 0 | 0 | 1 |
| 0 | 0 | 1 | 1 | 0 |
| 1 | 0 | 1 | -1 | 0 |
| 0 | 1 | 1 | -1 | 1 |
| 1 | 1 | 1 | 1 | 1 |

| $t0 + x_n + y_n$ | 920 c1in | code | 908 c1out |
|---|---|---|---|
| -2 | 0 | -2 | 0 |
| -1 | 0 | -1 | 0 |
| 0 | 0 | 0 | 0 |
| 1 | 0 | 1 | 0 |
| 2 | 0 | -2 | 1 |
| 3 | 0 | -1 | 1 |
| -2 | 1 | -1 | 0 |
| -1 | 1 | 0 | 0 |
| 0 | 1 | 1 | 0 |
| 1 | 1 | 2 | 0 |
| 2 | 1 | -1 | 1 |
| 3 | 1 | 0 | 1 |

Again, in order to form a multiple bit adder/Booth encoder 202, several stages 900 are strung together. The c0out 903 of each stage is connected to the c0in 916 of the next stage, and the c1out 908 is connected to the c1in 920 of the next stage.

Figure 9B:
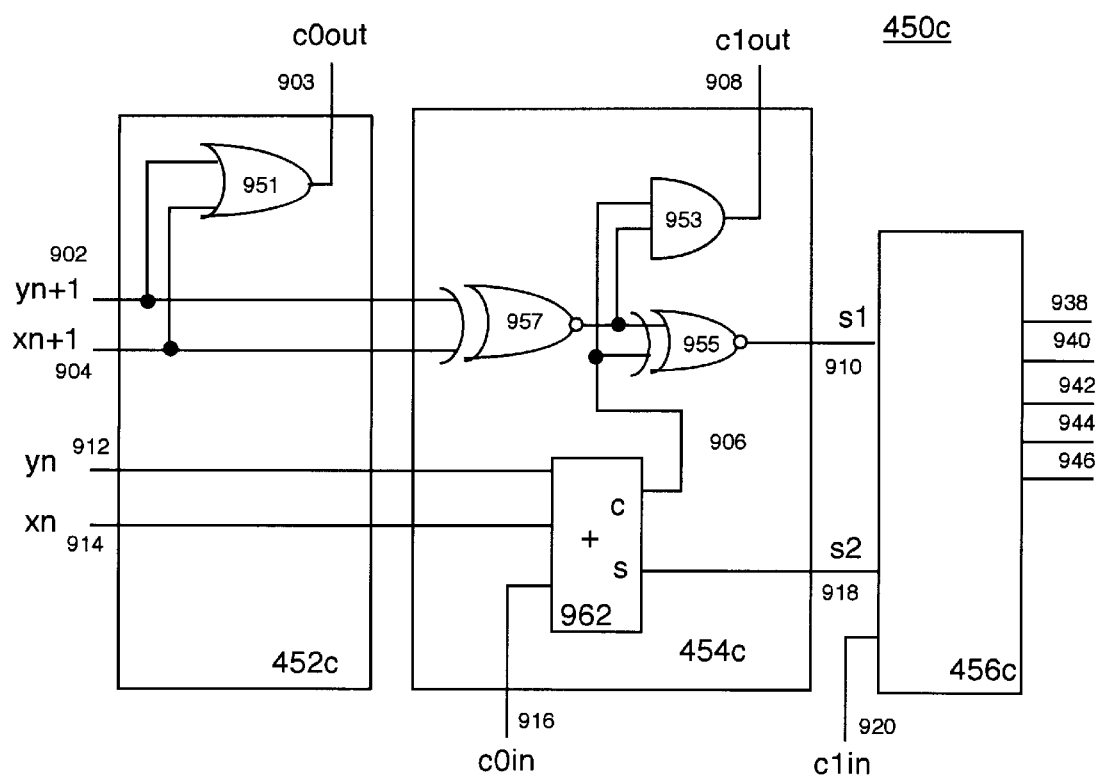
FIG. 9B is a block diagram representation of FIG. 9A.

FIG. 9B shows the circuitry of FIG. 9A in block diagram form, in the format of FIG. 4A. First carry generation block 452c passes xn 914, yn 912, xn+1 904 and yn+1 902 unchanged to second carry generation block 452b. xn+1 904 and yn+1 902 are ORed to form c0out 903.

Second carry generation block 452c adds xn 914 and yn 912 to form sum2 918 and carry2 906. XNORs 957 and 955 combine xn+1 904 and yn+1 902 with carry2 906 from adder 962 to form sum1 910. XNOR 957 and AND 953 combine xn+1 904 and yn+1 902 with carry2 906 from adder 962 to form c1out 908.

Output code generation block 456c is identical to coding block 456a of FIG. 4C. Coding block 456c combines sum1 910, sum2 918 and c1in 920 and determines the Booth code of sum1 910 and sum2 918, taking into account carry c1in 920.

Many other variations of this circuitry are possible. The key is the concept of the integration of the add/carry and the Booth encoding. It will be obvious to one versed in logic design that many equivalent gate implementations can be used.

Figure 10:
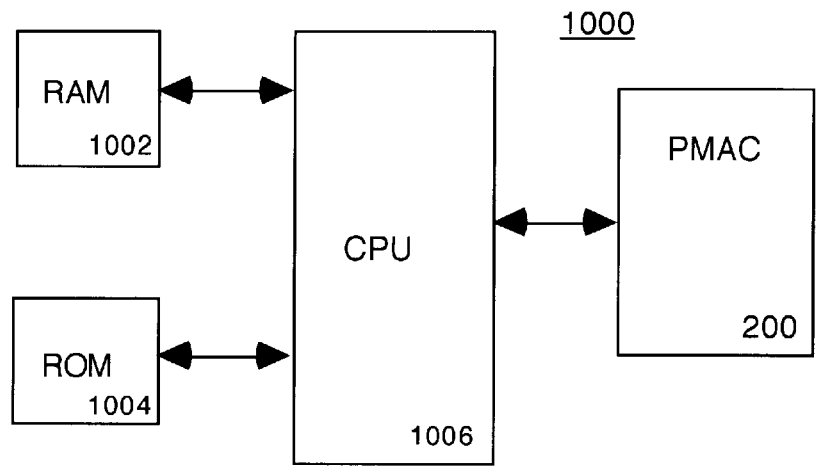
FIG. 10 shows a chip-based digital signal processor including the PMAC of FIG. 2.

FIG. 10 shows that a PMAC may be used as the arithmetic unit of a computer, forming digital signal processor 1000. This is especially valuable if the target processor is to be used for Digital Signal Processing (DSP). CPU 1006 communicates with RAM 1002 and ROM 1004 in a conventional manner. PMAC 200 is connected to CPU 1006, and acts as an arithmetic unit.

Figure 11:
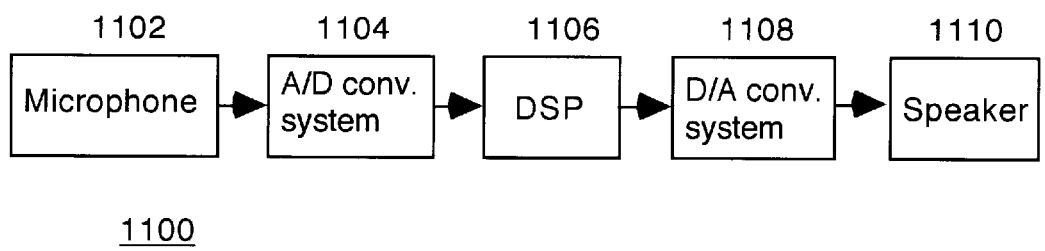
FIG. 11 shows a hearing aid including the digital signal processor of FIG. 10.

FIG. 11 shows a hearing aid utilizing the digital signal processor of FIG. 10. FIG. 11 shows hearing aid 1100 comprising a microphone 1102, an A/D conversion system 1104, Digital Signal Processor (DSP) 1106, a D/A conversion system 1108, and a speaker 1110. The components of the hearing aid of FIG. 11 are conventional and well understood, except that DSP 1106 has been modified in accordance with the present invention. In the preferred embodiment, DSP 1106 is similar to DSP 1000 of FIG. 10.

The attached appendix is a vhdl description of the pre-add circuit and a test program for it.

While the exemplary preferred embodiments of the present invention are described herein with particularity, those skilled in the art will appreciate various changes, additions, and applications other than those specifically mentioned, which are within the spirit of this invention.

APPENDIX

```
Here is a vhdl description of the pre add circuit, and a test program for
it.
pmac.vhd is the circuit, and pmac_t the tester
library ieee;
library arithmetic;
use ieee.std_logic_1164.all;
use arithmetic.std_logic_arith.all;
entity pmac is
  generic (N: in Natural := 16); -- Must be even
  port (x, y: in std_logic_vector (N-1 downto 0);
    Two, One, Sign: out std_logic_vector (N/2 downto 0));
end pmac;
architecture behavior1 of pmac is
  signal x1, y1: std_logic_vector(N+1 downto 0);
begin
  x1 <= "00" & x;
  y1 <= "00" & y;
add: process(x1 ,y1)
  variable sel: std_logic_vector(2 downto 0);
  variable c0, c1: std_logic:='0';
  variable s1, t1, t2: std_logic:='0';
begin
  c0:='0';
  c1:='0';
  L1: for i in 0 to (N/2)loop
    s1 := c0 xor x1(i*2) xor y1(i*2);    -- sum in adder
    t1 := (c0 and x1(i*2)) or (c0 and y1(i*2))
       or (x1(i*2) and y1(i*2));        -- carry1
    t2 := x1(i*2+1) xor y1(i*2+1);
    c0 := x1(i*2+1) and y1(i*2+1);
    sel(2 downto 0) := t1 & t2 & s1; -- Weight 2, 2, 1;
    if c1='0' then
    case sel is
      when "000" => Two(i) <='0'; One(i)<='0'; Sign(i)<='0'; -- 0
      when "001" => Two(i) <='0'; One(i)<='1'; Sign(i)<='0'; -- 1
      when "010" => Two(i) <='1'; One(i)<='0'; Sign(i)<='1'; -- 4-2
      when "011" => Two(i) <='0'; One(i)<='1'; Sign(i)<='1'; -- 4-1
      when "100" => Two(i) <='1'; One(i)<='0'; Sign(i)<='1'; -- 4-2
      when "101" => Two(i) <='0'; One(i)<='1'; Sign(i)<='1'; -- 4-1
      when "110" => Two(i) <='0'; One(i)<='0'; Sign(i)<='0'; -- 4-0
      when "111" => Two(i) <='0'; One(i)<='1'; Sign(i)<='0'; -- 4+1
      when others => Two(i) <='0'; One(i)<='1'; Sign(i)<='0';
    end case;
    else
    case sel is
      when "000" => Two(i) <='0'; One(i)<='1'; Sign(i)<='0'; -- 1
      when "001" => Two(i) <='1'; One(i)<='0'; Sign(i)<='0'; -- 2
      when "010" => Two(i) <='0'; One(i)<='1'; Sign(i)<='1'; -- 4-1
      when "011" => Two(i) <='0'; One(i)<='0'; Sign(i)<='0'; -- 4-0
      when "100" => Two(i) <='0'; One(i)<='1'; Sign(i)<='1'; -- 4-1
      when "101" => Two(i) <='0'; One(i)<='0'; Sign(i)<='0'; -- 4-0
      when "110" => Two(i) <='0'; One(i)<='1'; Sign(i)<='0'; -- 4+1
      when "111" => Two(i) <='1'; One(i)<='0'; Sign(i)<='0'; -- 4+2
      when others => Two(i) <='1'; One(i)<='0'; Sign(i)<='0';
    end case;
    end if;
    c1 :=t1 or t2;
  end loop;
end process;
end behavior1;
architecture behavior2 of pmac is
```

APPENDIX-continued

```
  signal x1, y1: std_logic_vector(N+1 downto 0);
begin
  x1 <= "00" & x;
  y1 <= "00" & y;
  add: process(x1 ,y1)
  variable sel: std_logic_vector(2 downto 0);
  variable c0, c1: std_logic:='0';
  variable s1, t1, t2: std_logic:='0';
begin
  c0:='0';
  c1:='0';
  L1: for i in 0 to (N/2) loop
    s1 := c0 xor x1(i*2) xor y1(i*2);    -- sum in adder
    t1 := (c0 and x1(i*2)) or (c0 and y1(i*2))
       or(x1(i*2) and y1(i*2));         --carry1
    t2 := x1(i*2+1) xor y1(i*2+1);
    c0 := x1(i*2+1) or y1(i*2+1);
    sel(2 downto 0) := t1 & t2 & s1; -- Weight 2, -2, 1;
    it c1='0' then
    case sel is         -- t0+xn+yn
      when "000" => Two(i) <='0'; One(i)<='0'; Sign(i)<='0'; -- 0
      when "001" => Two(i) <='0'; One(i)<='1'; Sign(i)<='0'; -- 1
      when "010" => Two(i) <='1'; One(i)<='0'; Sign(i)<='1'; -- -2
      when "011" => Two(i) <='0'; One(i)<='1'; Sign(i)<='1'; -- -1
      when "100" => Two(i) <='1'; One(i)<='0'; Sign(i)<='1'; -- 2
      when "101" => Two(i) <='0'; One(i)<='1'; Sign(i)<='1'; -- 3
      when "110" => Two(i) <='0'; One(i)<='0'; Sign(i)<='0'; -- 0
      when "111" => Two(i) <='0'; One(i)<='1'; Sign(i)<='0'; -- 1
      when others => Two(i) <='0'; One(i)<='1'; Sign(i)<='0';
    end case;
    else
    case sel is
      when "000" => Two(i) <='0'; One(i)<='1'; Sign(i)<='0'; -- 0
      when "001" => Two(i) <='1'; One(i)<='0'; Sign(i)<='0'; -- 1
      when "010" => Two(i) <='0'; One(i)<='1'; Sign(i)<='1'; -- -2
      when "011" => Two(i) <='0'; One(i)<='0'; Sign(i)<='1'; -- -1
      when "100" => Two(i) <='0'; One(i)<='1'; Sign(i)<='1'; -- 2
      when "101" => Two(i) <='0'; One(i)<='0'; Sign(i)<='1'; -- 3
      when "110" => Two(i) <='0'; One(i)<='1'; Sign(i)<='1'; -- 0
      when "111" => Two(i) <='1'; One(i)<='0'; Sign(i)<='0'; -- 1
      when others => Two(i) <='1'; One(i)<='0'; Sign(i)<='0';
    end case;
    end if;
    c1 :=t1 and not(t2);
  end loop;
  end process;
end behavior2;
architecture behavior3 of pmac is
  signal x1, y1: std_logic_vector(N+1 downto 0);
begin
  x1 <= "00" & x;
  y1 <= "00" & y;
add: process(x1 ,y1)
  variable sel: std_logic_vector(2 downto 0);
  variable c0, c1: std_logic:='0';
  variable s1, t1, t2: std_logic:='0';
begin
  c0:='0';
  c1:='0';
  L1:for i in 0 to (N/2) loop
    s1 := c0 xor x1(i*2) xor y1(i*2);    -- sum in adder
    t1 := (c0 and x1(i*2)) or (c0 and y1(i*2))
       or (x1 (i*2) and y1(i*2));       -- carry1
    t2 := not(x1(i*2+1) xor not(y1(i*2+1)) xor t1); - sum in subtract.
    c0 := y1(i*2+1);
    sel(2 downto 0) := t2 & s1 & c1;-- Weight -2, 1, 1;
    case sel is
      when "000" => Two(i) <='0'; One(i)<='0'; Sign(i)<='0';
      when "001" => Two(i) <='0'; One(i)<='0'; Sign(i)<='0';
      when "010" => Two(i) <='0'; One(i)<='1'; Sign(i)<='0';
      when "011" => Two(i) <='1'; One(i)<='0'; Sign(i)<='0';
      when "100" => Two(i) <='1'; One(i)<='0'; Sign(i)<='1';
      when "101" => Two(i) <='0'; One(i)<='1'; Sign(i)<='1';
      when "110" => Two(i) <='0'; One(i)<='1'; Sign(i)<='1';
      when "111" => Two(i) <='0'; One(i)<='0'; Sign(i)<='1';
      when others => Two(i) <='0'; One(i)<='0'; Sign(i)<='1';
    end case;
    c1 :=(t1 and x1(i*2+1)) or (t1 and not(y1(i*2+1)))
      or (x1(i*2+1) and not(y1(i*2+1)));
```

APPENDIX-continued

```
end loop;
end process;
end behavior3;
library ieee, arithmetic, std;
  use ieee.std_logic_1164.all;
  use ieee.math_real.all;
  use arithmetic.std_logic_arith.all;
  use std.textio.all;
entity pmac_t is
  generic (N: in Natural:=16);
  port (error: inout std_logic);
end pmac_t;
architecture behavior of pmac_t is
  component pmac
  generic (N: in Natural := 16);
  port (x, y: in std_logic_vector (N–1 downto 0);
    Two, One, Sign: out std_logic_vector (N/2 downto 0));
  end component;
  for all:pmac use entity work.pmac(behavior3);
  signal Two, One, Sign: std_logic_vector (N/2 downto 0);
  signal a, b: std_logic_vector(N–1 downto 0);
begin
  mydec: pmac generic map(N) port map (a, b, Two, One, Sign);
  test: process
  variable s1: std_logic_vector(N downto 0);
  variable ai, bi, aiplusbi, booth_res: integer;
  variable seed1, seed2: integer:= 678;
  variable myreal: real;
begin
  uniform(seed1, seed2, myreal);
  a <= std_logic_vector(to_stdlogicvector
(integer(myreal*65536.0), N));
  uniform(seed1, seed2, myreal);
  b <= std_logic_vector(to_stdlogicvector
(integer(myreal*65536.0), N));
  wait for 10 ns;
  s1:=('0' & a) + ('0' & b);
  ai:=to_integer(std_logic_vector('0' & a));
  bi:=to_integer(std_logic_vector('0' & b));
  aiplusbi := to_integer('0' & s1);
  booth_res:= 0;
  for I in N/2 downto 0 loop
  if Sign(I)='1' then
    booth_res :=booth_res*4–2*to_integer(Two(I))–to_integer(One(I));
  end if;
  if Sign(I)='0' then
    booth_res :=booth_res*4+2*to_integer(Two(I))+to_integer(One(I));
  end if;
  end loop;
  wait for 10 ns;
  if aiplusbi=booth_res then
  error <= '0';
  else
  error <= '1';
  end if;
  wait for 80 ns;
  assert (error='0') report "beregningsfeji";
  end process;
end behavior;
```

We claim:

1. An integrated adder and Booth encoder stage for combining n bits of a binary number x, n bits of a binary number y, a first carry in signal, and a second carry in signal to generate the Booth code of the sum of the n bits of x, the n bits of y, and the first and second carry in signals, said stage comprising:

a first carry generation block for receiving the n bits of x and the n bits of y, said first carry block operating to generate a first set of intermediate signals and a first carry out signal based upon the n bits of x and the n bits of y;

a second carry generation block for receiving the first set of intermediate signals and the first carry in signal, said second carry block operating to generate a second set of intermediate signals and a second carry out signal based upon the first set of intermediate signals and the first carry in signal; and an output code generation block for receiving the second set of intermediate signals and the second carry in signal, said output code block operating to generate a Booth code based upon the second set of intermediate signals and the second carry in signal.

2. An integrated adder and booth encoder for combining n+m bits of a binary number x, n+m bits of a binary number y, a first carry in signal, and a second carry in signal to generate Booth codes based on the n+m bits of x, the n+m bits of y, and the first and second carry in signals, said integrated adder and booth encoder comprising:

a lower significant stage including:

a lower significant first carry generation block for receiving the lower significant n bits of x and the lower significant n bits of y, said lower significant first carry block operating to generate a lower significant first set of intermediate signals and a lower significant first carry out signal based upon the lower significant n bits of x and the lower significant n bits of y;

a lower significant second carry generation block for receiving the lower significant first set of intermediate signals and the lower significant first carry in signal, said lower significant second carry block operating to generate a lower significant second set of intermediate signals and a lower significant second carry out signal based upon the lower significant first set of intermediate signals and the lower significant first carry in signal; and a lower significant output code generation block for receiving the lower significant second set of intermediate signals and the lower significant second carry in signal, said lower significant output code block operating to generate a lower significant Booth code based upon the lower significant second set of intermediate signals and the lower significant second carry in signal; and a higher significant stage including:

a higher significant first carry generation block for receiving the higher significant m bits of x and the higher significant m bits of y, said higher significant first carry block operating to generate a higher significant first set of intermediate signals and a higher significant first carry out signal based upon the higher significant m bits of x and the higher significant m bits y;

a higher significant second carry generation block for receiving the higher significant first set of intermediate signals and the lower significant first carry out signal, said higher significant second carry block operating to generate a higher significant second set of intermediate signals and a higher significant second carry out signal based upon the higher significant first set of intermediate signals and the lower significant first carry out signal; and a higher significant output code generation block for receiving the higher significant second set of intermediate signals and the lower significant second carry out signal, said higher significant output code block operating to generate a higher significant Booth code based upon the higher significant second set of intermediate signals and the lower significant second carry out signal.

3. Apparatus for receiving input binary numbers x, y, and z and generating the quantity $(x+y)*z$ comprising:

the integrated adder and booth encoder of claim 2 for receiving x and y and generating the Booth code of x+y; and a Booth multiplier connected to the integrated adder and booth encoder, for receiving z and the Booth code of x+y from the integrated adder and booth encoder, and Booth multiplying z with the Booth code of x+y.

4. Apparatus for receiving input binary numbers x, y, z, and xx and generating the quantity (x+y)*z+zz comprising:

the integrated adder and booth encoder of claim 2 for receiving x and y and generating the Booth code of x+y;

a Booth multiplier connected to the integrated adder and booth encoder, for receiving z and the Booth code of x+y from the integrated adder and booth encoder, and Booth multiplying z with the Booth code of x+y to produce (x+y)*z; and an adder connected to the Booth multiplier, for receiving zz and the quantity (x+y)*z from the Booth encoder, and adding zz to the quantity (x+y)*z to produce the quantity (x+y)*z+zz.

5. A digital signal processor of the type including a central processing unit (CPU), random access memory connected to the CPU, and read only memory connected to the CPU, the improvement comprising:

a pre-add multiplication accumulation unit (PMAC) connected to the CPU, said PMAC including the integrated adder and booth encoder of claim 2 for receiving x and y and generating the Booth code of x+y;

a Booth multiplier connected to the integrated adder and booth encoder, for receiving z and the Booth code of x+y from the integrated adder and Booth encoder, and Booth multiplying z with the Booth code of x+y to produce (x+y)*z; and an adder connected to the Booth multiplier, for receiving zz and the quantity (x+y)*z from the Booth encoder, and adding zz to the quantity (x+y)*z to produce the quantity (x+y)*z+zz.

6. A hearing aid, of the type including an audio receiver to receive ambient sound, an analog to digital (A/D) converter to convert the sound to a high resolution, low rate digital signal, digital processing circuitry to modify the quality of the high resolution, low rate digital signal, interpolator circuitry for converting the high resolution, medium rate digital signal to a medium rate, high resolution signal, a digital to analog (D/A) converter for converting the modified high resolution, medium rate digital signal back into analog sound, wherein the improvement is improved digital processing circuitry, said improved digital processing circuitry comprising:

a central processing unit (CPU);

random access memory connected to the CPU;

read only memory connected to the CPU; and a pre-add multiplication accumulation unit (PMAC) connected to the CPU, said PMAC including the integrated adder and booth encoder of claim 2 for receiving x and y and generating the Booth code of x+y;

a Booth multiplier connected to the integrated adder and booth encoder, for receiving z and the Booth code of x+y from the integrated adder and Booth encoder, and Booth multiplying z with the Booth code of x+y to produce (x+y)*z; and an adder connected to the Booth multiplier, for receiving zz and the quantity (x+y)*z from the Booth encoder, and adding zz to the quantity (x+y)*z to produce the quantity (x+y)*z+zz.

7. An integrated adder and Booth encoder stage for combining a more significant bit xn+1 and a less significant bit xn of a binary number x with a more significant bit yn+1 and a less significant bit yn of a binary number y And with a first carry in signal and a second carry in signal to generate the Booth code for bit positions n and n+1, said integrated adder and Booth encoder comprising:

a first carry generation block for receiving xn, yn, xn+1 and yn+1, said first carry generation block operating to generate a first carry out signal and a first set of intermediate signals;

a second carry generation block for receiving the first set of intermediate signals and the first carry in signal, said second carry generation block operating to generate a second carry out signal and a second set of intermediate signals; and an output code generation block for receiving the second set of intermediate signals and the second carry in signal, said output code generation block operating to generate a Booth code based upon the second set of intermediate signals and the second carry in signal.

8. The integrated adder and Booth encoder stage of claim 7 wherein:

the first carry generation block includes means for providing yn+1 as the first carry out and means for providing yn+1, xn+1 inverted, yn, and xn as the first set of intermediate signals; and the second carry generator includes:

a least significant adder for adding xn, yn, and the first carry in; and providing sum and carry inverted outputs; and a most significant adder for adding yn+1, xn+1 inverted, and the carry from the least significant adder and providing sum and carry inverted outputs;

wherein the carry inverted output of the most significant adder is the second carry out, and the sum outputs from the most significant adder and the least significant adder are the second set of intermediate signals.

9. The integrated adder and Booth encoder stage of claim 7 wherein:

the first carry generation block includes means for providing xn+1 AND yn+1 as the first carry out and means for providing yn+1 xn+1, yn, and xn as the first set of intermediate signals; and the second carry generator includes:

an adder for adding xn, yn, and the first carry in; and providing sum and carry outputs; and a first XOR gate connected to the first carry generation block for providing the logical XOR of xn+1 and yn+1, a second XNOR gate connected to the first XOR gate and the adder for providing the logical XOR of the output of the first XOR gate and the carry output of the adder, and an OR gate connected to the first XOR gate and the adder for providing the logical OR of the output of the first XOR gate and the carry output of the adder;

wherein the output of the OR gate is the second carry out, and the sum output from the adder and output of the second XOR are the second set of intermediate signals.

10. The integrated adder and Booth encoder stage of claim 7 wherein:

the first carry generation block includes means for providing xn+1 OR yn+1 as the first carry out and means for providing yn+1, xn+1, yn, and xn as the first set of intermediate signals; and the second carry generator includes:

an adder for adding xn, yn, and the first carry in; and providing sum and carry outputs; and a first XNOR gate connected to the first carry generation block for providing the logical XNOR of xn+1 and yn+1, a second XNOR gate connected to the first XNOR gate and the adder for providing the logical XNOR of the output of the first XNOR gate and the carry output of the adder, and an AND gate connected to the first XNOR gate and the adder for providing the logical AND of the output of the first XNOR gate and the carry output of the adder;

wherein the output of the AND gate is the second carry out, and the sum output from the adder and the output of the second XNOR are the second set of intermediate signals.

11. A multiple stage adder and booth encoder for adding a multiple bit number x and a multiple bit number y comprising a plurality of the stages of claim 7 and wherein:

a first of the stages, designated the lowest significant stage receives x0, x1, y0, y1, the first carry in and the second carry in, said lowest significant stage operating to generate a lowest significant Booth code based upon x0, x1, y0, y1, the first carry in and the second carry in, and to generate a lowest significant first carry out and a lowest significant second carry out; and a second of the stages, designated the second lowest significant stage receives x2, x3, y2, y3, the lowest significant first carry out and the lowest significant second carry out, said second lowest significant stage operating to generate a lowest significant Booth code based on x2, x3, y2, y3, the lowest significant first carry out and the lowest significant second carry out, and a second lowest significant first carry out and a second lowest significant second carry out; and each succeeding stage receives the next two lowest significant bits available of x and y and the first and second carry out from the previous stage, and operates to generate a Booth code based on the next two bits of x and y and the first and second carry outs from the previous stage, and to generate a first carry out and a second carry.

* * * * *

UNITED STATES PATENT AND TRADEMARK OFFICE
CERTIFICATE OF CORRECTION

PATENT NO. : 5,835,393  
DATED : November 10, 1998  
INVENTOR(S) : Melanson et al.

Page 1 of 3

It is certified that error appears in the above-identified patent and that said Letters Patent is hereby corrected as shown below:

On the title page,

Abstract, line 1, delete "preadder" and insert --pre-adder--.

Abstract, line 13, after 'carry in' delete "is the".

Column 2, line 3, delete "call" and insert --called--.

Column 4, line 15, delete "booth" and insert --Booth--.

Column 4, line 41, delete "booth" and insert --Booth--.

Column 4, line 44, delete "xx" and insert --zz--.

Column 4, line 49, delete "booth" and insert --Booth--.

Column 4, line 58, between 'CPU' and 'The' insert --. --.

Column 4, line 59, delete "booth" and insert --Booth--.

Column 4, line 61, delete "booth" and insert --Booth--.

Column 6, line 12, delete "booth" and insert --Booth--.

Column 6, line 35, delete "s" and insert --shows--.

Column 7, line 34, between 'since it' and 'the output' insert --is --.

UNITED STATES PATENT AND TRADEMARK OFFICE
CERTIFICATE OF CORRECTION

PATENT NO. : 5,835,393                 Page 2 of 3
DATED        : November 10, 1998
INVENTOR(S) : Melanson et al.

It is certified that error appears in the above-identified patent and that said Letters Patent is hereby corrected as shown below:

Column 13, line 53, delete "pre adder" and insert --pre-adder--.

Column 18, line 8, delete "booth" and insert --Booth--.

Column 18, line 13, delete "booth" and insert --Booth--.

Column 19, line 1, delete "booth" and insert --Booth--.

Column 19, line 5, delete "booth" and insert --Booth--.

Column 19, line 6, delete "booth" and insert --Booth--.

Column 19, line 9, delete "xx" and insert --zz--.

Column 19, line 10, delete "booth" and insert --Booth--.

Column 19, line 14, delete "booth" and insert --Booth--.

Column 19, line 15, delete "booth" and insert --Booth--.

Column 19, line 28, delete "booth" and insert --Booth--.

Column 19, line 32, delete "booth" and insert --Booth--.

Column 19, line 58, delete "booth" and insert --Booth--.

Column 19, line 62, delete "booth" and insert --Booth--.

UNITED STATES PATENT AND TRADEMARK OFFICE
CERTIFICATE OF CORRECTION

PATENT NO. : 5,835,393
DATED : November 10, 1998
INVENTOR(S) : Melanson et al.

It is certified that error appears in the above-identified patent and that said Letters Patent is hereby corrected as shown below:

Column 20, line 6, delete "And" and insert --and--.

Column 20, line 33, after 'carry in' delete ";" and insert --,--.

Column 20, line 46, after 'providing yn+1' insert --, --.

Column 20, line 50, after 'carry in' delete ";" and insert --, --.

Column 21, line 19, delete "booth" and insert --Booth--.

Signed and Sealed this

Fourth Day of May, 1999

Attest:

Attesting Officer

Q. TODD DICKINSON

Acting Commissioner of Patents and Trademarks